US005432300A

United States Patent [19]

Fujisawa et al.

[11] Patent Number: 5,432,300

[45] Date of Patent: Jul. 11, 1995

[54] PROTECTING CONSTRUCTION FOR END PORTION OF SHIELDED ELECTRIC CABLE

[75] Inventors: Atsushi Fujisawa; Isao Akasaka; Hiroyuki Hamada, all of Yokkaichi, Japan

[73] Assignee: Sumitomo Wiring Systems, Ltd., Japan

[21] Appl. No.: 106,379

[22] Filed: Aug. 13, 1993

[30] Foreign Application Priority Data

Sep. 22, 1992 [JP] Japan .............................. 4-072125 U

[51] Int. Cl.[6] ............................................ H02G 15/02

[52] U.S. Cl. .................................... 174/74 R; 174/19; 174/78; 174/80; 174/92; 174/85 C; 174/88 C

[58] Field of Search ...................... 174/74 R, 74 A, 19, 174/78, 80, 75 C, 88 C, 92

[56] References Cited

U.S. PATENT DOCUMENTS

| | | | |
|---|---|---|---|
| 3,787,607 | 1/1974 | Schlafly | 174/88 C |
| 3,875,325 | 4/1975 | Anderson et al. | 174/92 |
| 4,489,217 | 12/1984 | Klopfer | 174/75 C |
| 4,594,474 | 6/1986 | Spinner | 174/88 C |
| 4,598,165 | 7/1986 | Tsai | 174/36 |
| 4,750,805 | 6/1988 | Vaderwall | 174/36 |
| 4,767,893 | 8/1988 | Ball et al. | 174/84 R |
| 4,791,236 | 12/1988 | Klein et al. | 174/36 |
| 4,869,683 | 9/1989 | Nelson | 439/369 |

FOREIGN PATENT DOCUMENTS

| | | |
|---|---|---|
| 287716 | 10/1988 | European Pat. Off. . |
| 4194 | 12/1987 | Japan . |

*Primary Examiner*—Morris H. Nimmo

*Attorney, Agent, or Firm*—Jordan B. Bierman; Bierman and Muserlian

[57] ABSTRACT

This invention aims to facilitate attaching and positional correction of a protecting member for an unshielded section on an end portion of a shielding electric cable 1 and to enhance flexibility of processes of working and wiring the cable 1 and flexibility of a wiring posture of the cable 1. A protecting construction for an end portion of a shielded electric cable 1 comprises: an unshielded section on the end portion of the cable; a flexible and insulative protecting tube 10 having a shielding layer 8 on the interior thereof, the protecting tube 10 being provided with a slit 7 along an axial direction so that the tube 10 can be opened and closed in a peripheral direction, the protecting tube 10 being mounted through the slit 7 on the unshielded section on the end portion of the cable 1; and a tape 11 wound around the protecting tube 10 to secure it (10) to the end portion of the cable 1. The slit protecting tube 10 forms a protecting member for the unshielded section.

2 Claims, 2 Drawing Sheets

PROTECTING CONSTRUCTION FOR END PORTION OF SHIELDED ELECTRIC CABLE

BACKGROUND OF THE INVENTION

1. Field of the Invention

This invention relates to a protecting construction for an end portion of a shielded electric cable which prevents an electromagnetic wave from leaking out of conductors provided in the cable and protects the conductors from the effect of external electromagnetic wave.

2. Statement of the Prior Art

An end portion of a shielded electric cable is formed into an unshielded section including conductors and a drain wire, The jackets and shielding layers of which are stripped off and exposed by a substantial length (about 150 mm). Japanese Utility Model Public Disclosure No. 62-4194 (1987) discloses a protecting means which covers the unshielded section on the end portion of the shielding electric cable with a contractible tube having a shielding effect and contracts the tube to secure it on the unshielded section after wiring.

On the other hand, Japanese Utility Model Public Disclosure No. 2-72617 (1990) discloses a protective construction in which a flexible protecting sheet having a shielding effect is provided on an electric cable to be shielded and then the protecting sheet is shrink-fitted into a tube to be secured on the cable.

In the above prior arts, the tube through which the cable passes and the protecting sheet which is wrapped around the cable are shrunk to be secured around the cable. When a failure of an attaching position of the tube or the like or a wrong attachment of a terminal onto a connector is found after the tube or the like has been secured around the cable, correcting work must be carried out by breaking the secured portion. Consequently, wastage of parts and time results. In addition, the protecting construction utilizing the tube disclosed in Japanese Utility Model Public Disclosure No. 62-4194 (1987) is subject to working and wiring limitations since the wiring process must be carried out after a terminal is connected to an end of the electric cable passed through the tube on account of different sizes of the connector and terminal.

SUMMARY OF THE INVENTION

An object of the present invention is to provide a protective construction for an end portion of a shielded electric cable which can facilitate attaching and correcting works of a protecting member for an unshielded section on the end portion and enhance flexibility of processes of working and wiring the cable and flexibility of a wiring posture off the cable.

In order to achieve the above object, a protecting construction for an end portion off a shielded electric cable in accordance with the present invention comprises:

an unshielded section on said end portion of said cable;

a flexible and insulative protecting tube having a shielding layer provided on the interior thereof, said protecting tube being provided with a slit in an axial direction so that said tube can be opened and closed in a peripheral direction, said protecting tube being mounted through said slit on said unshielded section on said end portion of said cable; and a tape wound around said protecting tube to secure it to said end portion of said cable.

In the protecting construction for the end portion of the shielding electric cable of the present invention, since the slit protecting tube is mounted on the unshielded section on the end portion and the tube is secured to the end portion by the tape, the unshielded section is covered with the shielding layer on the interior of the tube. Accordingly, the conductors in the unshielded section within the slitted protecting tube do not leak electromagnetic waves out of the cable and are protected against external electromagnetic waves.

Since the protecting tube is slit along its axial direction so that for opening and closing in its peripheral direction, it is very easy to mount and dismount the tube with respect to the unshielded section through the slit in the tube. Also, the slit protecting tube can be secured to the unshielded section by means off tape, it is possible to readily carry out misalignment correcting work without breaking the protecting construction. Further, since the process of attaching the silt protecting tube to the shielded cable may be carried out before or after wiring the cable or connecting the connector thereto, the flexibility of working processes of the shielded cable can be enhanced, the conductors or the unshielded drain wire can be drawn out of the protecting tube through the slit, and the flexibility of the wiring posture of the end portion can be also enhanced.

DETAILED DESCRIPTION OF THE PREFERRED EMBODIMENTS

Figure 1A:
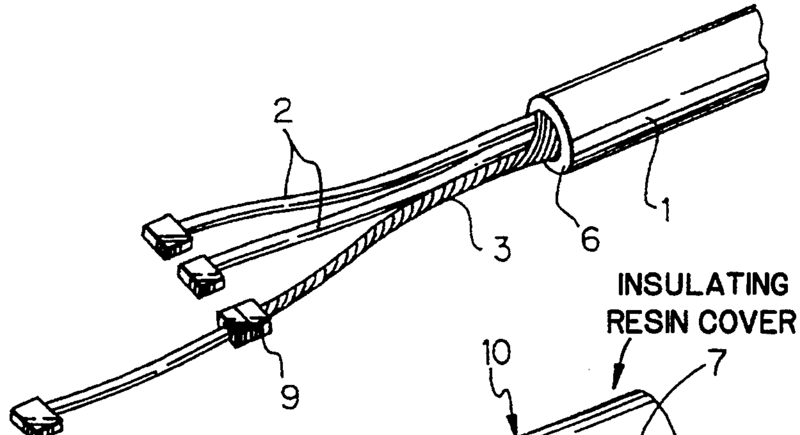
FIG. 1A through 1D are perspective views of electric cables under each of processes for forming a protecting construction for an end portion of a shielded electric cable in accordance with the present invention.
Figure 1B:
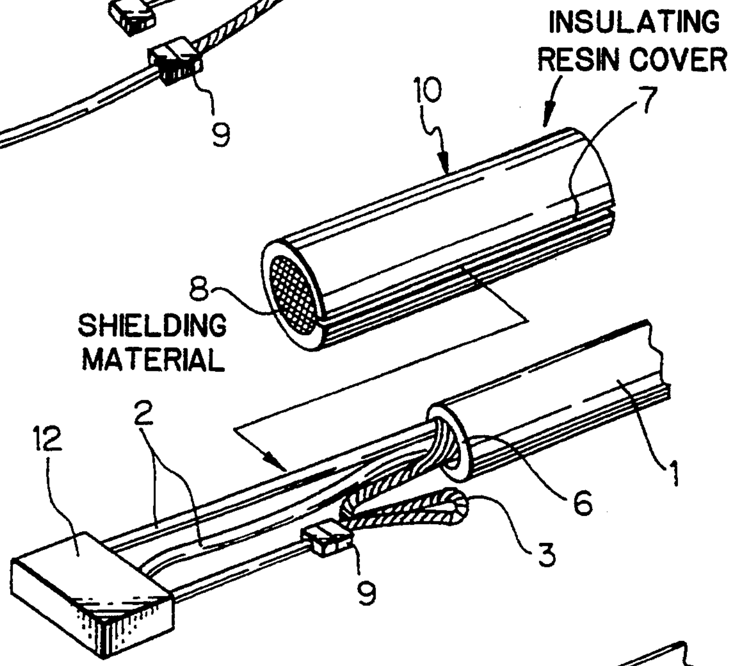
Figure 1C:
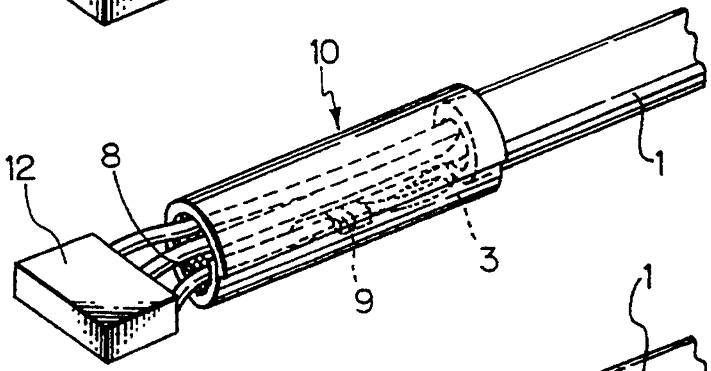
Figure 1D:
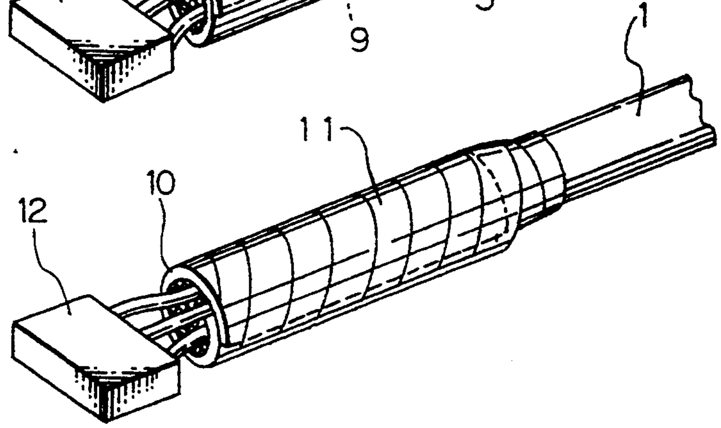

Referring now to FIG. 1, an embodiment of the present invention will be explained below. A round shielded electric cable 1 includes conductors 2 covered with an insulation sheath, a shielding drain wire 8 which is wound around the conductors 2 twisted with each other, a jacket 6 around the drain wire 3. An unshielded section is formed on an end portion of the shielded electric cable 1 by stripping the jacket 6 and the insulation sheath from the wire 3 and the conductors 2 by a substantial length (about 150 mm) to expose and free them, thereby adapting them to be connected to another parts. A slitted protecting tube 10 is mounted on the unshielded section to form a protecting construction for the end portion of the cable 1.

The slitted protecting tube 10 is made of a flexible and insulative resin type. The tube 10 has an inner diameter and a length necessary to house the conductors 2 and the shielding drain wire 3 in its internal space. The tube 10 is provided with a slit 7 in the axial direction so that the tube 10 can be opened and closed in the peripheral direction. The tube 10 is provided on the interior with a shielding layer 8 made of a metal net. In the drawings, the reference number 9 indicates a terminal for connecting the shielding drain wires 3 and the reference number 12 a connector.

The slit protecting tube 10 can receive the conductors 2 and the shielding drain wire 3 in the unshielded section on the end portion of the cable 1 by widening the slit 7. After superimposing opposite edges of the slit 7, the tape 11 is wound around the tube 10 to secure it to the section. Accordingly, the conductors 2 in the tube 10 are effectively protected and readily mounted on and dismounted from the end portion.

Figure 2:
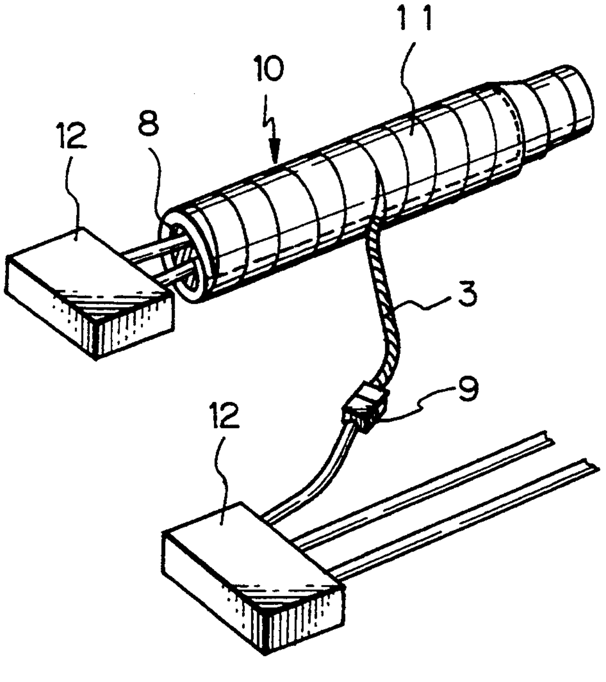
FIG. 2 is a perspective view of another embodiment of the protecting construction for the end portion of the shielded electric cable in accordance with the present invention.

Referring to FIG. 2, another embodiment of the present invention will be explained below. The protecting construction shown In FIG. 2 uses the same slitted protecting tube 10 shown in FIG. 1. The shielding drain wire 3 is drawn out of the tube 10 at an intermediate pare off the slit 7 and is connected to another connector 12. The construction shown in FIG. 2 can enhance the flexibility of wiring the shielded electric cable.

The shielding layer 8 on the interior of the slit protecting tube 10 may be a known metal foil, a known metal fiber sheet, a known conductive paint or the like as well as the metal net.

As described above, the protecting construction for the end portion of the shielding cable enables the slit protecting tube to be readily mounted and dismounted with respect to the unshielded section on the end portion and for its position to be easily corrected without breaking the tube even if it is misaligned. Further, the construction can enhance the flexibilities of working and wiring the shielding electric cable.

What is claimed is:

1. A protecting construction for an end portion of a shielded electric cable comprising:

an unshielded section on an end portion of a shielded electric cable;

a flexible and insulative protecting tube having a flexible shielding layer provided on the interior thereof, said protecting tube having a slit in an axial direction so that said tube can be opened and closed in a peripheral direction, said protecting tube being mounted through said slit on said unshielded section on said end portion of said shielded electric cable; and a tape wound around said protecting tube to secure it to said end portion of said shielded electric cable, said unshielded section having conductors and a shielding drain wire, wherein said protecting tube houses said conductors and said shielding drain wire.

2. The protecting construction of claim 1 wherein a part of said shielding drain wire extends out of an intermediate part of said slit in said protecting tube, and a connector coupled to an end of said shielding drain wire extends out of said protecting tube.

* * * * *